US009870728B2

(12) United States Patent
Tseng et al.

(10) Patent No.: US 9,870,728 B2
(45) Date of Patent: Jan. 16, 2018

(54) WHITE ORGANIC LIGHT-EMITTING DIODE DISPLAY DEVICE, ITS DISPLAY CONTROL METHOD, AND DISPLAY CONTROL DEVICE

(71) Applicant: BOE TECHNOLOGY GROUP CO., LTD., Beijing (CN)

(72) Inventors: Szuheng Tseng, Beijing (CN); Danna Song, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 197 days.

(21) Appl. No.: 14/769,415

(22) PCT Filed: Feb. 5, 2015

(86) PCT No.: PCT/CN2015/072302
§ 371 (c)(1),
(2) Date: Aug. 20, 2015

(87) PCT Pub. No.: WO2016/061944
PCT Pub. Date: Apr. 28, 2016

(65) Prior Publication Data
US 2016/0253942 A1 Sep. 1, 2016

(30) Foreign Application Priority Data
Oct. 24, 2014 (CN) .......................... 2014 1 0575290

(51) Int. Cl.
G09G 3/3208 (2016.01)
G09G 3/20 (2006.01)
G06T 11/00 (2006.01)

(52) U.S. Cl.
CPC .......... G09G 3/2003 (2013.01); G06T 11/001 (2013.01); G09G 3/3208 (2013.01);
(Continued)

(58) Field of Classification Search
None
See application file for complete search history.

(56) References Cited

U.S. PATENT DOCUMENTS

2004/0178974 A1* 9/2004 Miller .................. G09G 3/3225
345/82
2005/0225562 A1* 10/2005 Higgins .................. G09G 5/02
345/604
(Continued)

FOREIGN PATENT DOCUMENTS

CN 1815750 A 8/2006
CN 101059936 A 10/2007
(Continued)

OTHER PUBLICATIONS

First Office Action regarding Chinese application No. 201410575290.2, dated Jan. 6, 2016. Translation provided by Dragon Intellectual Property Law Firm.
(Continued)

Primary Examiner — Ryan M Gray
(74) Attorney, Agent, or Firm — Harness, Dickey & Pierce, P.L.C.

(57) ABSTRACT

The present disclosure provides a white organic light-emitting diode (WOLED) display device, its display control method, and a display control device. The method includes: receiving red (R), green (G) and blue (B) source data, and determining a minimum value of the R, G and B source data; determining white (W) data in accordance with the minimum value; determining chromaticity coordinates of a WOLED in accordance with the W data; acquiring a brightness value of the WOLED desired for compensating for the chromaticity coordinates of the WOLED to a target value, and a gain value of a subpixel participating in chromatic aberration compensation; and determining output values of R, G, B and W data in accordance with the brightness value (Continued)

of the WOLED, the gain value of the subpixel participating in the chromatic aberration compensation and the W data.

21 Claims, 4 Drawing Sheets

(52) U.S. Cl.
CPC ............. *G09G 2320/0242* (2013.01); *G09G 2320/0666* (2013.01); *G09G 2340/06* (2013.01); *G09G 2360/16* (2013.01)

(56) References Cited

U.S. PATENT DOCUMENTS

| | | | | |
|---|---|---|---|---|
| 2009/0040207 A1* | 2/2009 | Park | .................... | G09G 3/2003 345/211 |
| 2010/0315449 A1* | 12/2010 | Chaji | ................... | G09G 3/3208 345/690 |
| 2013/0070007 A1* | 3/2013 | Park | .................... | G09G 3/3233 345/694 |
| 2014/0071189 A1* | 3/2014 | Park | ........................ | G09G 5/02 345/694 |
| 2014/0078197 A1* | 3/2014 | Park | .................... | G09G 3/3291 345/694 |
| 2014/0184655 A1* | 7/2014 | Jang | .................... | G09G 3/3208 345/690 |
| 2014/0267442 A1* | 9/2014 | Lin | ...................... | G09G 3/3208 345/690 |

FOREIGN PATENT DOCUMENTS

| | | |
|---|---|---|
| CN | 102262853 A | 11/2011 |
| CN | 103680413 A | 3/2014 |
| CN | 103854606 A | 6/2014 |
| CN | 103903563 A | 7/2014 |
| CN | 103915078 A | 7/2014 |
| CN | 104091578 A | 10/2014 |
| CN | 104269138 A | 1/2015 |
| KR | 20120063049 A | 6/2012 |
| KR | 20130035004 A | 4/2013 |

OTHER PUBLICATIONS

Written Opinion of the International Searching Authority for international application No. PCT/CN2015/072302.

* cited by examiner

| Red | Green | Blue | White |
|---|---|---|---|
| ↑ | ↑ | ↑ | ↑ |
| RCF | GCF | BCF | NO CF |
| WOLED | WOLED | WOLED | WOLED |

Fig. 1

WHITE ORGANIC LIGHT-EMITTING DIODE DISPLAY DEVICE, ITS DISPLAY CONTROL METHOD, AND DISPLAY CONTROL DEVICE

CROSS-REFERENCE TO RELATED APPLICATION

The present application is the U.S. national phase of PCT Application No. PCT/CN2015/072302 filed on Feb. 5, 2015, which claims a priority of the Chinese patent application No. 201410575290.2 filed on Oct. 24, 2014, which is incorporated herein by reference in its entirety.

TECHNICAL FIELD

The present disclosure relates to the field of organic light-emitting diode (OLED) display, in particular to a white OLED (WOLED) display device, its display control method, and a display control device.

BACKGROUND

As compared with a traditional liquid crystal panel, an active matrix organic light-emitting diode (AMOLED) panel has such features as rapid response, high contrast and wide viewing angle. A traditional white AMOLED panel consists of a WOLED and a color filter (CF) for three colors, i.e., red (R), green (G) and blue (B). However, for this panel, the color filter is of relatively low transmittance, and most of the white light from the WOLED is absorbed by the color filter. In order to ensure display brightness, it is required to increase a current flowing through the WOLED, which thus results in an increase in the power consumption of the display panel and a decrease in a service life of the WOLED. A white AMOLED panel with a RGBW display mode consists of the WOLED and a color filter for four colors, i.e., R, G, B and W. A W subpixel is of transmittance far greater than RGB subpixels, so it is able to remarkably reduce the power consumption for the display in the case of an identical brightness requirement.

For the white AMOLED panel with the RGBW display mode, it is required to convert external RGB source data into RGBW data. In a traditional conversion method, some of the light from the RGB subpixels is replaced with the white light, so as to reduce the power consumption and increase the brightness. However, the white light is emitted by the WOLED through a combination of light-emitting layers in multiple colors, so the color of the light is changed depending on a driving voltage of a material used herein. As a result, the white light from the WOLED is not the standard, pure white light, and the color of the light from the WOLED is changed along with the brightness. At this time, after the RGB data is converted into the RGBW data, the image quality is adversely affected due to the chromatic aberration of the WOLED.

SUMMARY

An object of the present disclosure is to provide an OLED display device, its display control method, and a display control device, so as to prevent images displayed by a WOLED display device from being adversely affected due to the chromatic aberration of a WOLED after RGB data is converted into RGBW data.

In one aspect, the present disclosure provides a display control method for a WOLED display device, including: receiving R, G and B source data, and determining a minimum value of the R, G and B source data; determining W data in accordance with the minimum value of the R, G and B source data; determining chromaticity coordinates of a WOLED in accordance with the W data; acquiring a brightness value of the WOLED desired for compensating for the chromaticity coordinates of the WOLED to a target value, and a gain value of a subpixel participating in chromatic aberration compensation; and determining output values of R, G, B and W data in accordance with the brightness value of the WOLED, the gain value of the subpixel participating in the chromatic aberration compensation and the W data.

Alternatively, the step of determining the chromaticity coordinates of the WOLED in accordance with the W data includes: looking up a chromaticity coordinate table in accordance with the W data, so as to acquire the chromaticity coordinates of the WOLED corresponding to the W data, wherein different W data, the chromaticity coordinates of the WOLED corresponding to the different W data, and chromaticity coordinates of R, G and B subpixels being recorded in the chromaticity coordinate table.

Alternatively, the step of acquiring the brightness value of the WOLED desired for compensating for the chromaticity coordinates of the WOLED to the target value, and the gain value of the subpixel participating in chromatic aberration compensation includes: acquiring from the chromaticity coordinate table the chromaticity coordinates of the WOLED corresponding to the W data and the chromaticity coordinates of the subpixel participating in the chromatic aberration compensation; and calculating the brightness value of the WOLED desired for compensating for the chromaticity coordinates of the WOLED to the target value, and the gain value of the subpixel participating in chromatic aberration compensation using predetermined color-mixing equations in accordance with the chromaticity coordinates of the WOLED corresponding to the W data and the chromaticity coordinates of the subpixel participating in the chromatic aberration compensation.

Alternatively, the predetermined color-mixing equations include:

$$L\_WOLED = \left(\frac{Oy}{Wy}\right) * \frac{\left[\frac{Wx-Ax}{Cx-Ax} - \frac{Wz-Az}{Cz-Az}\right]}{\left[\frac{Ox-Ax}{Cx-Ax} - (Oz-Az)\right]},$$

$$LC = \frac{\left(\frac{Cy}{Wy}\right)(Ww-Ax)}{Cx-Ax} - \frac{\left(\frac{L\_WOLED}{Oy}\right)(Ox-Ax)}{Cx-Ax}, \text{ and}$$

$$LA = 1 - L\_WOLED - LC,$$

wherein O(Ox,Oy,Oz) represents the chromaticity coordinates of the WOLED corresponding to the W data, A(Ax,Ay,Az) and C(Cx,Cy,Cz) represent the chromaticity coordinates of two subpixels participating in the chromatic aberration compensation, respectively, (Wx,Wy,Wz) represents the chromaticity coordinates of the target value, L_WOLED represents the brightness value of the WOLED, and LA and LC represent the gain values of the two subpixels participating in the chromatic aberration compensation, respectively.

Alternatively, the step of determining the output values of the R, G, B and W data in accordance with the brightness value of the WOLED, the gain value of the subpixel participating in the chromatic aberration compensation and the W data includes: with respect to the subpixel participating in the chromatic aberration compensation, acquiring a product of the gain value of the subpixel and the W data, and calculating a difference between an initial brightness value of the subpixel participating in the chromatic aberration compensation and the product, so as to obtain a final brightness value of the subpixel participating in the chromatic aberration compensation; with respect to the subpixel not participating in the chromatic aberration compensation, calculating a difference between an initial brightness value of the subpixel not participating in the chromatic aberration compensation and the W data so as to obtain a final brightness value of the subpixel not participating in the chromatic aberration compensation, wherein the initial brightness value of the subpixel is obtained in accordance with the R, G and B source data; and determining the output values of the R, G, B and W data in accordance with the final brightness value of the subpixel participating in the chromatic aberration subpixel, the final brightness value of the subpixel not participating in the chromatic aberration subpixel and the brightness value of the WOLED.

Alternatively, the final brightness value of the subpixel is calculated using the following equations:

$$R'=R-R\_gain \times W$$

$$G'=G-G\_gain \times W$$

$$B'=B-B\_gain \times W$$

$$W'=L\_WOLED$$

wherein R', G', B' and W' represent the final brightness values of the R, G, B and W subpixels, respectively, R, G and B represent the initial brightness values obtained in accordance with the R, G and B source data, respectively, R_gain, G_gain and B_gain represent the gain values of the R, G and B subpixels, respectively, the gain value of the subpixel not participating in the chromatic aberration compensation is 1, W represents the white data, and L_WOLED represents the brightness value of the WOLED.

Alternatively, the step of determining the W data in accordance with the minimum value of the R, G and B source data includes: acquiring a currently-stored white-mixing ratio, the white-mixing ratio is a ratio of the W data to the minimum value of the R, G and B source data to be replaced with the W data; and calculating a product of the minimum value of the R, G and B source data and the white-mixing ratio, so as to obtain the W data.

Alternatively, prior to the step of determining the W data in accordance with the minimum value of the R, G and B source data, the display control method further includes: judging whether or not a subpixel corresponding to the minimum value of the R, G and B source data is the subpixel participating in the chromatic aberration compensation; when the subpixel corresponding to the minimum value of the R, G and B source data is the subpixel participating in the chromatic aberration compensation, incrementing a value of the currently-stored white-mixing ratio; and when the subpixel corresponding to the minimum value of the R, G and B source data is not the subpixel participating in the chromatic aberration compensation, decrementing the value of the currently-stored white-mixing ratio.

Alternatively, the step of incrementing the value of the currently-stored white-mixing ratio includes: counting the gain values of the subpixels participating in the chromatic aberration compensation; and when the subpixel corresponding to the minimum value of the R, G and B source data is the subpixel participating in the chromatic aberration compensation, determining an increment of the currently-stored white-mixing ratio in accordance with the counted gain values of the subpixels participating in the chromatic aberration compensation.

Alternatively, the display control method further includes: counting the output values of the R, G, B and W data; and adjusting the value of the currently-stored white-mixing ratio in accordance with the counted output values of the R, G, B and W data.

Alternatively, the step of adjusting the value of the currently-stored white-mixing ratio in accordance with the counted output values of the R, G, B and W data includes: comparing an average value of the output values of the R, G and B data and an average value of the output value of the W data; when the average value of the output data of the R, G and B data is greater than the average value of the output value of the W data, incrementing the white-mixing ratio; and when the average value of the output data of the R, G and B data is less than the average value of the output value of the W data, decrementing the white-mixing ratio.

Alternatively, the target value is chromaticity coordinates of pure white light desired for the WOLED display device.

In another aspect, the present disclosure provides a display control device for a WOLED display device, including: a reception module configured to receive R, G and B source data; a minimum value determination module configured to determine a minimum value of the R, G and B source data; a W data determination module configured to determine W data in accordance with the minimum value of the R, G and B source data; a chromaticity coordinate determination module configured to determine chromaticity coordinates of a WOLED in accordance with the W data; a gain value determination module configured to acquire a brightness value of the WOLED desired for compensating for the chromaticity coordinates of the WOLED to a target value, and a gain value of a subpixel participating in chromatic aberration compensation; and an algorithm conversion module configured to determine output values of R, G, B and W data in accordance with the brightness value of the WOLED, the gain value of the subpixel participating in the chromatic aberration compensation and the W data.

Alternatively, the chromaticity coordinate determination module is configured to look up a chromaticity coordinate table in accordance with the W data, so as to acquire the chromaticity coordinates of the WOLED corresponding to the W data, wherein different W data, the chromaticity coordinates of the WOLED corresponding to the different W data, and chromaticity coordinates of R, G and B subpixels being recorded in the chromaticity coordinate table.

Alternatively, the gain value determination module is configured to acquire from the chromaticity coordinate table the chromaticity coordinates of the WOLED corresponding to the W data and the chromaticity coordinates of the subpixel participating in the chromatic aberration compensation; and calculate the brightness value of the WOLED desired for compensating for the chromaticity coordinates of the WOLED to the target value, and the gain value of the subpixel participating in chromatic aberration compensation using predetermined color-mixing equations in accordance with the chromaticity coordinates of the WOLED corresponding to the W data and the chromaticity coordinates of the subpixel participating in the chromatic aberration compensation.

Alternatively, the predetermined color-mixing equations include:

$$L\_WOLED = \left(\frac{Oy}{Wy}\right) * \frac{\left[\frac{Wx-Ax}{Cx-Ax} - \frac{Wz-Az}{Cz-Az}\right]}{\left[\frac{Ox-Ax}{Cx-Ax} - (Oz-Az)\right]},$$

$$LC = \frac{\left(\frac{Cy}{Wy}\right)(Ww-Ax)}{Cx-Ax} - \frac{\left(\frac{L\_WOLED}{Oy}\right)(Ox-Ax)}{Cx-Ax}, \text{ and}$$

$$LA = 1 - L\_WOLED - LC,$$

wherein $O(Ox,Oy,Oz)$ represents the chromaticity coordinates of the WOLED corresponding to the W data, $A(Ax, Ay, Az)$ and $C(Cx, Cy, Cz)$ represent the chromaticity coordinates of two subpixels participating in the chromatic aberration compensation, respectively, $(Wx, Wy, Wz)$ represents the chromaticity coordinates of the target value, L_WOLED represents the brightness value of the WOLED, and LA and LC represent the gain values of the two subpixels participating in the chromatic aberration compensation, respectively.

Alternatively, the algorithm conversion module is configured to, with respect to the subpixel participating in the chromatic aberration compensation, acquire a product of the gain value of the subpixel and the W data, and calculate a difference between an initial brightness value of the subpixel participating in the chromatic aberration compensation and the product, so as to obtain a final brightness value of the subpixel participating in the chromatic aberration compensation; with respect to the subpixel not participating in the chromatic aberration compensation, calculate a difference between an initial brightness value of the subpixel not participating in the chromatic aberration compensation and the W data so as to obtain a final brightness value of the subpixel not participating in the chromatic aberration compensation, wherein the initial brightness value of the subpixel is obtained in accordance with the R, G and B source data; and determine the output values of the R, G, B and W data in accordance with the final brightness value of the subpixel participating in the chromatic aberration subpixel, the final brightness value of the subpixel not participating in the chromatic aberration subpixel and the brightness value of the WOLED.

Alternatively, the final brightness value of the subpixel is calculated by the algorithm conversion module using the following equations:

$$R' = R - R\_gain \times W$$

$$G' = G - G\_gain \times W$$

$$B' = B - B\_gain \times W$$

$$W' = L\_WOLED$$

wherein R', G', B' and W' represent the final brightness values of the R, G, B and W subpixels, respectively, R, G and B represent the initial brightness values obtained in accordance with the R, G and B source data, respectively, R_gain, G_gain and B_gain represent the gain values of the R, G and B subpixels, respectively, the gain value of the subpixel not participating in the chromatic aberration compensation is 1, W represents the white data, and L_WOLED represents the brightness value of the WOLED.

Alternatively, the display control device further includes a storage module configured to store a white-mixing ratio, the white-mixing ratio is a ratio of the W data to the minimum value of the R, G and B source data to be replaced with the W data. The W data determination module is configured to acquire the currently-stored white-mixing ratio, and calculate a product of the minimum value of the R, G and B source data and the white-mixing ratio, so as to obtain the W data.

Alternatively, the display control device further includes: a judging module configured to judge whether or not a subpixel corresponding to the minimum value of the R, G and B source data is the subpixel participating in the chromatic aberration compensation; a first adjustment module configured to, when the subpixel corresponding to the minimum value of the R, G and B source data is the subpixel participating in the chromatic aberration compensation, increment a value of the currently-stored white-mixing ratio; and a second adjustment module configured to, when the subpixel corresponding to the minimum value of the R, G and B source data is not the subpixel participating in the chromatic aberration compensation, decrement the value of the currently-stored white-mixing ratio.

Alternatively, the display control device further includes a first counting module configured to count the gain values of the subpixels participating in the chromatic aberration compensation. The first adjustment module is further configured to, when the subpixel corresponding to the minimum value of the R, G and B source data is the subpixel participating in the chromatic aberration compensation, determine an increment of the currently-stored white-mixing ratio in accordance with the counted gain values of the subpixels participating in the chromatic aberration compensation.

Alternatively, the display control device further includes: a second counting module configured to count the output values of the R, G, B and W data; and a third adjustment module configured to adjust the value of the currently-stored white-mixing ratio in accordance with the counted output values of the R, G, B and W data.

Alternatively, the third adjustment module is configured to compare an average value of the output values of the R, G and B data and an average value of the output value of the W data; when the average value of the output data of the R, G and B source data is greater than the average value of the output value of the W data, increment the white-mixing ratio; and when the average value of the output data of the R, G and B source data is less than the average value of the output value of the W data, decrement the white-mixing ratio.

Alternatively, the target value is chromaticity coordinates of pure white light desired for the WOLED display device.

In yet another aspect, the present disclosure provides a WOLED display device including the above-mentioned display control device.

According to the embodiments of the present disclosure, when the R, G and B source data is converted into the R, G, B and W data, the color of the light from the WOLED is compensated so as to obtain the pure white light. As a result, after the R, G and B source data is converted into the R, G, B and W data, it is able to prevent an image from being adversely affected due to the chromatic aberration of the WOLED, thereby to improve the display quality of the WOLED display device.

BRIEF DESCRIPTION OF THE DRAWINGS

FIG. 1 is a schematic view showing a WOLED display device according to embodiments of the present disclosure;

DETAILED DESCRIPTION

In order to make the objects, the technical solutions and the advantages of the present disclosure more apparent, the present disclosure will be described hereinafter in conjunction with the drawings and embodiments.

The structure of a WOLED display device according to the embodiments of the present disclosure will be described hereinafter briefly.

The WOLED display device includes a plurality of pixels, each of which includes a R subpixel for generating red light, a G subpixel for generating green light, a B subpixel for generating blue light, and a W subpixel for generating white light. Each subpixel includes a WOLED, which emits the white light through a combination of light-emitting layers in multiple colors. As shown in FIG. 1, the R subpixel includes a red color filter (RCF) which is configured to allow the red light in the white light from the WOLED to pass therethrough, the G subpixel includes a green color filter (GCF) which is configured to allow the green light in the white light from the WOLED to pass therethrough, and the B subpixel includes a blue color filter which is configured to allow the blue light in the white light from the WOLED to pass therethrough. The W subpixel does not include any color filter, so all the white light from the WOLED can pass therethrough, so as to compensate for the image brightness when the image brightness is reduced due to the RCF, GCF and BCF.

Because the WOLED emits the white light through a combination of the light-emitting layers in multiple colors and the color of the light is changed depending on a driving voltage of a material used herein, the white light from the WOLED is not the standard pure white light. At this time, in the method of converting the R, G and B data into the R, G, B and W data, when some of the light from the R, G and B subpixels is replaced with the standard pure white light, chromatic aberration will occur.

Figure 2:
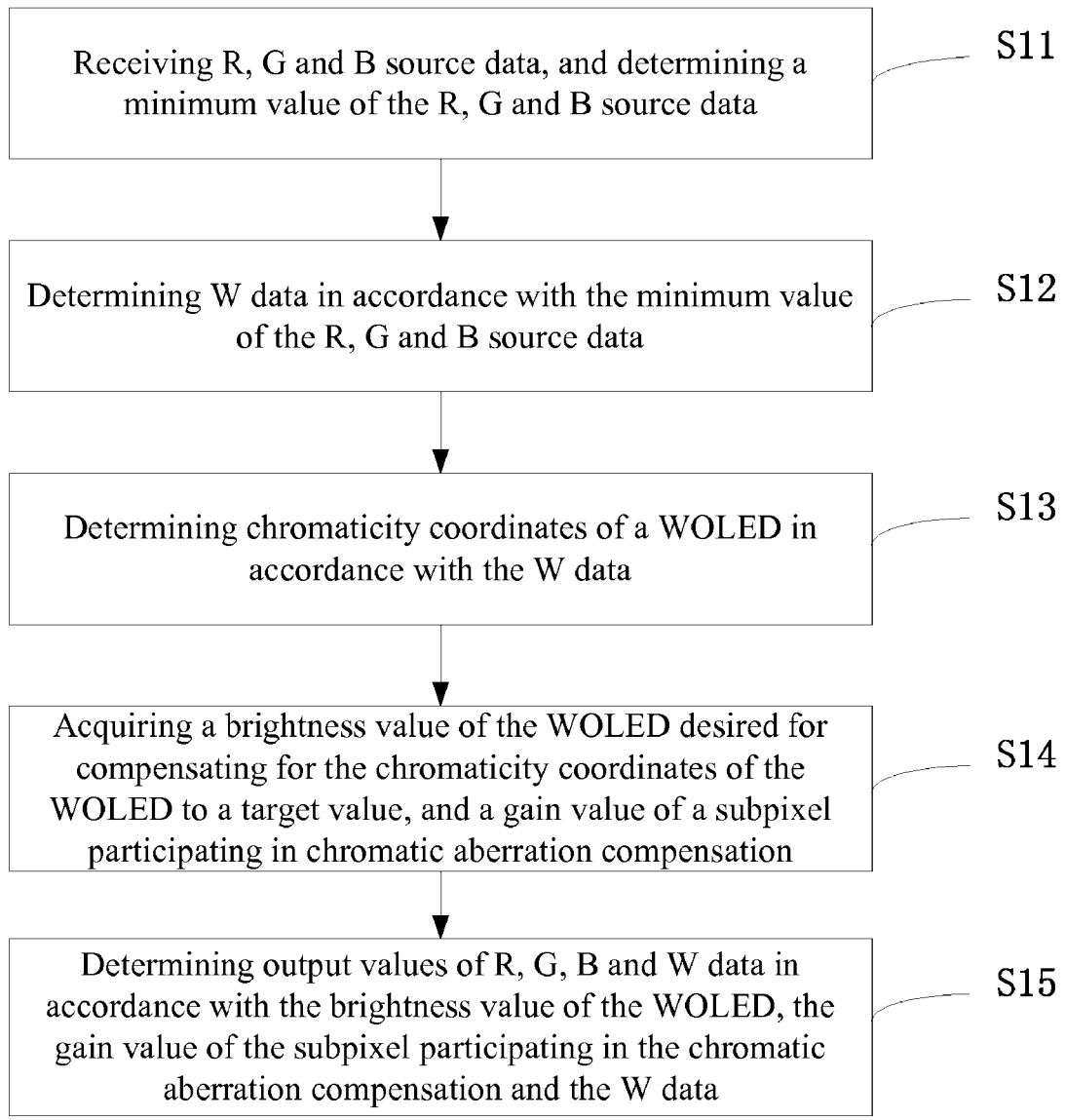
FIG. 2 is a flow chart of a display control method for the WOLED display device according to embodiments of the present disclosure.

In order to overcome the above-mentioned defects, as shown in FIG. 2, an embodiment of the present disclosure provides a display control method for a WOLED display device, which includes steps of: Step S11: receiving R, G and B source data, and determining a minimum value of the R, G and B source data; Step S12: determining W data in accordance with the minimum value of the R, G and B source data, the W data being a brightness value; Step S13: determining chromaticity coordinates of a WOLED in accordance with the W data; Step S14: acquiring a brightness value of the WOLED desired for compensating for the chromaticity coordinates of the WOLED to a target value, and a gain value of a subpixel participating in chromatic aberration compensation; and Step S15: determining output values of R, G, B and W data in accordance with the brightness value of the WOLED, the gain value of the subpixel participating in the chromatic aberration compensation and the W data.

According to the embodiment of the present disclosure, when the R, G and B source data is converted into the R, G, B and W data, the color of the light from the WOLED is compensated so as to obtain the pure white light. As a result, after the R, G and B source data is converted into the R, G, B and W data, it is able to prevent an image from being adversely affected due to the chromatic aberration of the WOLED, thereby to improve the display quality of the WOLED display device.

At Step S11, the received R, G and B source data may be brightness values or grayscale values. When the received R, G and B source data are grayscale values, it is required to convert the minimum value of the R, G and B source data into the brightness value.

To be specific, the grayscale-brightness conversion may be performed using the following equation:

$$Gray = L^{(1/\Gamma)} \times GL,$$

wherein Gray represents the grayscale value, L represents the brightness value, $\Gamma$ represents a gamma value, usually 2.2, and GL represents the total number of grayscales.

At Step S12, the minimum value of the R, G and B source data may be directly used as the W data, i.e., the light from the subpixel corresponding to the minimum value may be completely replaced with the white light. Of course, the light from the subpixel corresponding to the minimum value may be partially replaced with the white light in accordance with the practical need, i.e., the step of determining the W data in accordance with the minimum value of the R, G and B source data may include: Step S121: acquiring a currently-stored white-mixing ratio, i.e., a ratio of the W data to the minimum value of the R, G and B source data to be replaced with the W data; and Step S122: calculating a product of the minimum value of the R, G and B source data and the white-mixing ratio, so as to obtain the W data.

To be specific, the output value of the W data may be calculated by the following equation:

$$W = WMR \times \min(R,G,B),$$

wherein W represents the white data, WMR represents the white-mixing ratio, and min(R,G,B) represents the minimum value of the R, G and B source data.

For example, for the received R, G and B source data (i.e., the brightness values in this embodiment), R=1, G=0.8 and B=0.4, and the B source data is the minimum value. Presumed that the white-mixing ratio WMR is 0.5, i.e., the white light is of a brightness value that is 50% of the brightness value of the light from the subpixel corresponding to the minimum value and replaced with the white light, the W data may be calculated as W=WMR×min(R,G,B)=0.5×0.4=0.2.

At Step S13, the chromaticity coordinates of the WOLED may be determined by looking up a chromaticity coordinate table, in which different W data, the chromaticity coordinates of the WOLED corresponding to the different W data, and chromaticity coordinates of R, G and B subpixels obtained through multiple measurements are recorded. The following is the chromaticity coordinate table.

| W data (brightness value) | Chromaticity coordinates of WOLED | Chromaticity coordinates of R subpixel | Chromaticity coordinates of G subpixel | Chromaticity coordinates of B subpixel |
|---|---|---|---|---|
| 0.1 | (O1x, O1y, O1z) | (R1x, R1y, R1z) | (G1x, G1y, G1z) | (B1x, B1y, B1z) |
| 0.2 | (O2x, O2y, O2z) | (R2x, R2y, R2z) | (G2x, G2y, G2z) | (B2x, B2y, B2z) |
| 0.3 | (O3x, O3y, O3z) | (R3x, R3y, R3z) | (G3x, G3y, G3z) | (B3x, B3y, B3z) |
| ... | ... | ... | ... | ... |

In some cases, chromaticity coordinates of W subpixel desired for the display device, i.e., the target value, may also be recorded in the chromaticity coordinate table.

Presumed that the W data determined in the previous step has a value of 0.2, it is able to obtain the chromaticity coordinates (O2x,O2y,O2z) of the WOLED by looking up the chromaticity coordinate table.

At Step S14, for a display device, when the chromaticity coordinates of the WOLED are known, the brightness value of the WOLED desired for compensating for the chromaticity coordinates of the WOLED to the target value, and the gain values of the subpixels participating in chromatic aberration compensation may be obtained in accordance with the chromaticity coordinates. The subpixels participating in the chromatic aberration compensation are any two subpixels of the R, G and B subpixels, depending on the characteristics of the WOLED. The target value is the chromaticity coordinates of the pure white light desired for the WOLED display device, e.g., (0.33, 0.33, 0.34).

The step of acquiring the brightness value of the WOLED desired for compensating for the chromaticity coordinates of the WOLED to the target value, and the gain values of the subpixels participating in chromatic aberration compensation may include: acquiring from the chromaticity coordinate table the chromaticity coordinates of the WOLED corresponding to the W data and the chromaticity coordinates of the subpixels participating in the chromatic aberration compensation; and calculating the brightness value of the WOLED desired for compensating for the chromaticity coordinates of the WOLED to the target value, and the gain value of the subpixel participating in chromatic aberration compensation using predetermined color-mixing equations in accordance with the chromaticity coordinates of the WOLED corresponding to the W data and the chromaticity coordinates of the subpixel participating in the chromatic aberration compensation.

The predetermined color-mixing equations may include:

$$L\_WOLED = \left(\frac{Oy}{Wy}\right) * \frac{\left[\frac{Wx - Ax}{Cx - Ax} - \frac{Wz - Az}{Cz - Az}\right]}{\left[\frac{Ox - Ax}{Cx - Ax} - (Oz - Az)\right]},$$

$$LC = \frac{\left(\frac{Cy}{Wy}\right)(Ww - Ax)}{Cx - Ax} - \frac{\left(\frac{L\_WOLED}{Oy}\right)(Ox - Ax)}{Cx - Ax}, \text{ and}$$

$$LA = 1 - L\_WOLED - LC,$$

wherein O(Ox,Oy,Oz) represents the chromaticity coordinates of the WOLED corresponding to the W data, A(Ax,Ay,Az) and C(Cx,Cy,Cz) represent the chromaticity coordinates of two subpixels participating in the chromatic aberration compensation, respectively, (Wx,Wy,Wz) represents the chromaticity coordinates of the target value, L_WOLED represents the brightness value of the WOLED, and LA and LC represent the gain values of the two subpixels participating in the chromatic aberration compensation, respectively.

At Step S15, the step of determining the output values of the R, G, B and W data may include: with respect to the subpixel participating in the chromatic aberration compensation, acquiring a product of the gain value of the subpixel and the W data, and calculating a difference between an initial brightness value of the subpixel participating in the chromatic aberration compensation and the product, so as to obtain a final brightness value of the subpixel participating in the chromatic aberration compensation; with respect to the subpixel not participating in the chromatic aberration compensation, calculating a difference between an initial brightness value of the subpixel not participating in the chromatic aberration compensation and the W data so as to obtain a final brightness value of the subpixel not participating in the chromatic aberration compensation, wherein the initial brightness value of the subpixel being obtained in accordance with the R, G and B source data; and determining the output values of the R, G, B and W data in accordance with the final brightness value of the subpixel participating in the chromatic aberration subpixel, the final brightness value of the subpixel not participating in the chromatic aberration subpixel and the brightness value of the WOLED.

In the above-mentioned step, when the received R, G and B source data is brightness data, the initial brightness values of the R, G and B subpixels are just the source data, and when the received R, G an dB source data is grayscale data, it is required to convert the grayscale data into the brightness data so as to obtain the initial brightness values of the R, G and B subpixels.

To be specific, the final brightness values of the subpixels may be calculated using the following equations:

$$R' = R - R\_gain \times W$$

$$G' = G - G\_gain \times W$$

$$B' = B - B\_gain \times W$$

$$W' = L\_WOLED$$

wherein R', G', B' and W' represent the final brightness values of the R, G, B and W subpixels, respectively, R, G and B represent the initial brightness values obtained in accordance with the R, G and B source data, respectively, R_gain, G_gain and B_gain represent the gain values of the R, G and B subpixels, respectively, the gain value of the subpixel not participating in the chromatic aberration compensation is 1, W represents the white data, and L_WOLED represents the brightness value of the WOLED.

Figure 3:
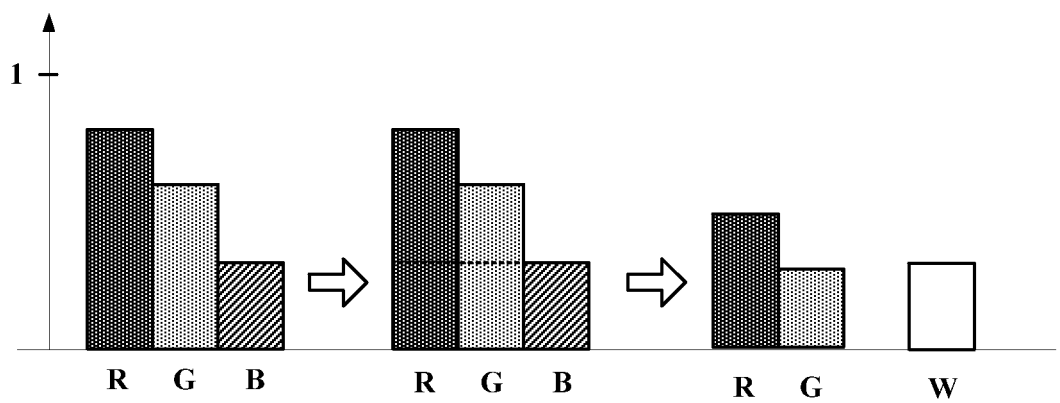
FIG. 3 is a view showing an algorithm for converting RGB into RGBW when the chromaticity of the WOLED is not compensated in the related art.
Figure 4:
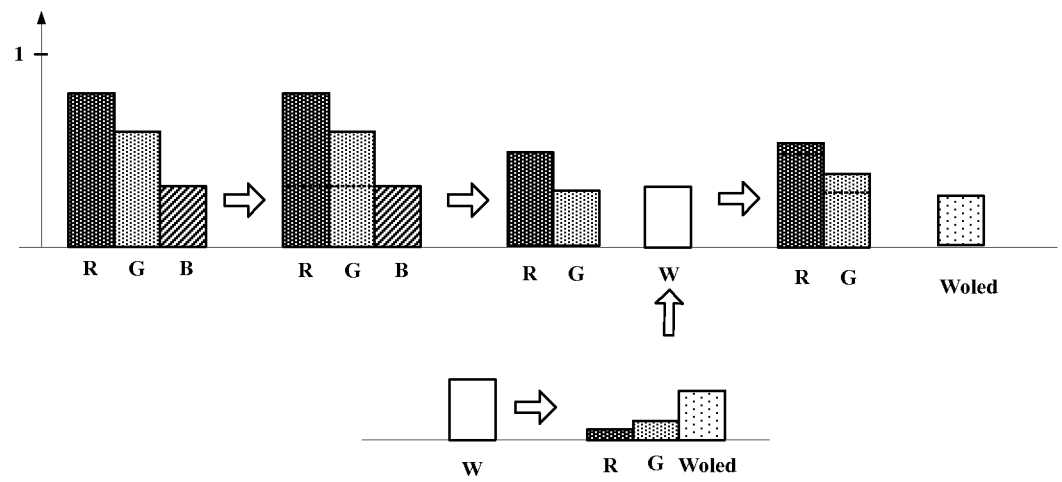
FIG. 4 is a view showing an algorithm for converting RGB into RGBW when the chromaticity of the WOLED is compensated according to embodiments of the present disclosure.

FIG. 3 is a view showing an algorithm for converting RGB into RGBW when the chromaticity of the WOLED is not compensated in the related art, and FIG. 4 is a view showing an algorithm for converting RGB into RGBW when the chromaticity of the WOLED is compensated according to one embodiment of the present disclosure. Taking the R, G and B source data as an example, as shown in FIG. 4, a minimum brightness value of the R, G and B source data, i.e., the B data, is obtained at first, and this minimum brightness value is used as the W data. Then, the chromaticity coordinate table is looked up in accordance with the W data, so as to determine the chromaticity coordinates of the WOLED. Next, the brightness value of the WOLED and the brightness gain values of the subpixels participating in the chromatic aberration compensation (e.g., R and G subpixels in this embodiment) may be determined in accordance with the chromaticity coordinates of the WOLED. Finally, the output values of the R, G, B and W data may be obtained in accordance with the brightness value of the WOLED, the W data, and the brightness gain values of the subpixels participating in the chromatic aberration compensation.

In the above embodiments, when the subsequent output values of the R, G, B and W are required to be grayscale values, it is required to convert the obtained brightness output values of the R, G, B and W data into the grayscale values.

In the above embodiments, because the subpixels participating in the chromatic aberration compensation are lighted up frequently due to the chromatic aberration compensation, a service life of each subpixel may probably be shortened. In order to overcome this defect, the use frequency of the subpixels participating in the chromatic aberration compensation may be reduced by adjusting the WMR.

To be specific, prior to the step of determining the W data in accordance with the minimum value of the R, G and B source data, the display control method may further include: judging whether or not a subpixel corresponding to the minimum value of the R, G and B source data is the subpixel participating in the chromatic aberration compensation; and when the subpixel corresponding to the minimum value of the R, G and B source data is the subpixel participating in the chromatic aberration compensation, incrementing a value of the currently-stored white-mixing ratio.

In addition, the use frequency of the subpixels not participating in the chromatic aberration compensation is relatively low, so the use frequency thereof may be increased by adjusting the value of the WMR, so as to reach a balance among the use frequencies of the R, G and B subpixels. In other words, when the subpixel corresponding to the minimum value of the R, G and B source data is not the subpixel participating in the chromatic aberration compensation, the display control method further includes decrementing the value of the currently-stored white-mixing ratio.

For example, when the R subpixel and the B subpixel participate in the chromatic aberration compensation and the minimum value min(R,G,B) of the R, G and B source data is the R data or B data, the value of the WRM may be incremented, so as to reduce the brightness value of the R or B subpixel. When the minimum value min(R,G,B) of the R, G and B source data is the G data, the value of the WMR may be decremented so as to increase the brightness value of the G subpixel.

In addition, the gain values of the subpixels participating in the chromatic aberration compensation may be counted, and when the subpixel corresponding to the minimum value of the R, G and B source data is the subpixel participating in the chromatic aberration compensation, an increment of the currently-stored white-mixing ratio may be determined in accordance with the counted gain values.

For example, when the R and B subpixels participate in the chromatic aberration compensation, the counted gain value of the R subpixel (e.g., an average of a plurality of gain values) is greater than that of the B subpixel and the subpixel corresponding to the minimum value of the R, G and B source data is the R subpixel, the value of the WMR may be incremented by a first value. When the subpixel corresponding to the minimum value of the R, G and B source data is the B subpixel, the value of the WMR may be incremented by a second value, wherein the second value is less than the first value.

In the above embodiments, when it is desired to reach a balance among the use frequencies of the R, G, B and W data, it is required to count the output values of the R, G, B and W data, and then adjust the WMR in accordance with the counted output values. To be specific, an average value of the output values of the R, G and B data may be compared with an average value of the output values of the W data. When the average value of the output values of the R, G and B data is greater than that of the W data, the WMR may be incremented, and when the average value of the output values of the R, G and B data is less than that of the W data, the WMR may be decremented.

In the above embodiments, suitable gamma conversion is required. To be specific, after receiving the R, G and B source data, the received R, G and B source data may be subjected to the gamma conversion using a predetermined gamma curve. In other words, in the above embodiments, the R, G and B source data participating in the calculation is the data obtained after the gamma conversion.

Figure 5:
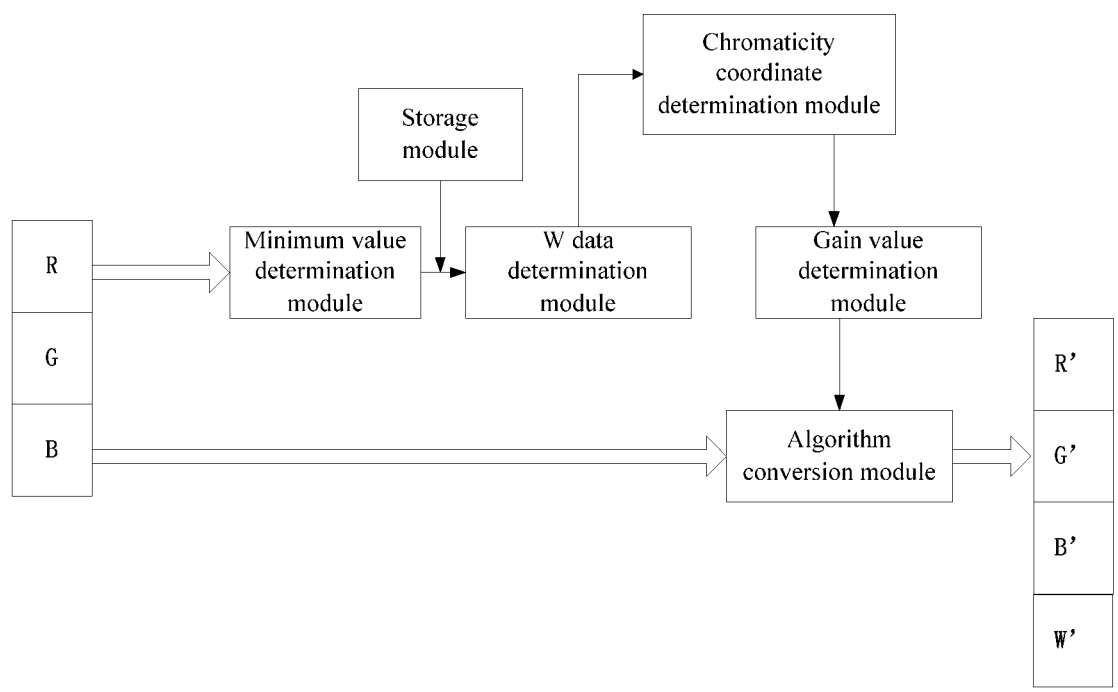
FIG. 5 is a schematic view showing a display control device for the WOLED display device according to embodiments of the present disclosure.

Referring to FIG. 5, the present disclosure further provides in one embodiment a display control device for a WOLED display device, which includes: a reception module configured to receive R, G and B source data; a minimum value determination module configured to determine a minimum value of the R, G and B source data; a W data determination module configured to determine W data in accordance with the minimum value of the R, G and B source data; a chromaticity coordinate determination module configured to determine chromaticity coordinates of a WOLED in accordance with the W data; a gain value determination module configured to acquire a brightness value of the WOLED desired for compensating for the chromaticity coordinates of the WOLED to a target value, and a gain value of a subpixel participating in chromatic aberration compensation; and an algorithm conversion module configured to determine output values of R, G, B and W data in accordance with the brightness value of the WOLED, the gain values of the subpixels participating in the chromatic aberration compensation and the W data.

According to the embodiment of the present disclosure, when the R, G and B source data is converted into the R, G, B and W data, the color of the light from the WOLED is compensated so as to obtain the pure white light. As a result, after the R, G and B source data is converted into the R, G, B and W data, it is able to prevent an image from being adversely affected due to the chromatic aberration of the WOLED, thereby to improve the display quality of the WOLED display device.

The R, G and B source data received by the reception module may be brightness value or grayscale value. When the received R, G and B source data is the grayscale value, it is required to convert the minimum value of the R, G and B source data into the brightness value.

To be specific, the grayscale-brightness conversion may be performed using the following equation, $$Gray = L^{(1/\Gamma)} \times GL,$$

wherein Gray represents the grayscale value, L represents the brightness value, $\Gamma$ represents a gamma value, usually 2.2, and GL represents the total number of grayscales.

The W data determination module may use the minimum value of the R, G and B source data as the W data, i.e., the light from the subpixel corresponding to the minimum value may be completely replaced with the white light. Of course, the light from the subpixel corresponding to the minimum value may be partially replaced with the white light, i.e., the display control device may further include a storage module configured to store a white-mixing ratio, i.e., a ratio of the W data to the minimum value of the R, G and B source data to be replaced with the W data. The W data determination module is configured to acquire the WMR stored in the storage module, and calculate a product of the minimum value of the R, G and B source data and the WMR, so as to obtain the W data.

To be specific, the output value of the W data may be calculated using the following equation:

$$W = WMR \times \min(R,G,B),$$

wherein W represents the white data, WMR represents the white-mixing ratio, and min(R,G,B) represents the minimum value of the R, G and B source data.

The chromaticity coordinate determination module may determine the chromaticity coordinates of the WOLED by looking up a chromaticity coordinate table, in which different W data, the chromaticity coordinates of the WOLED corresponding to the different W data, and chromaticity coordinates of R, G and B subpixels obtained through multiple measurements are recorded.

For a display device, when the chromaticity coordinates of the WOLED are known, the brightness value of the WOLED desired for compensating for the chromaticity coordinates of the WOLED to the target value, and the gain values of the subpixels participating in chromatic aberration compensation may be obtained in accordance with the chromaticity coordinates. The subpixels participating in the chromatic aberration compensation are any two subpixels of the R, G and B subpixels, depending on the characteristics of the WOLED. The target value is the chromaticity coordinates of the pure white light desired for the WOLED display device, e.g., (0.33, 0.33, 0.34).

Alternatively, the gain value determination module is configured to acquire from the chromaticity coordinate table the chromaticity coordinates of the WOLED corresponding to the W data and the chromaticity coordinates of the subpixel participating in the chromatic aberration compensation; and calculate the brightness value of the WOLED desired for compensating for the chromaticity coordinates of the WOLED to the target value, and the gain value of the subpixel participating in chromatic aberration compensation using predetermined color-mixing equations in accordance with the chromaticity coordinates of the WOLED corresponding to the W data and the chromaticity coordinates of the subpixel participating in the chromatic aberration compensation.

The predetermined color-mixing equations may include:

$$L\_WOLED = \left(\frac{Oy}{Wy}\right) * \frac{\left[\frac{Wx - Ax}{Cx - Ax} - \frac{Wz - Az}{Cz - Az}\right]}{\left[\frac{Ox - Ax}{Cx - Ax} - (Oz - Az)\right]},$$

$$LC = \frac{\left(\frac{Cy}{Wy}\right)(Ww - Ax)}{Cx - Ax} - \frac{\left(\frac{L\_WOLED}{Oy}\right)(Ox - Ax)}{Cx - Ax}, \text{ and}$$

$$LA = 1 - L\_WOLED - LC,$$

wherein O(Ox,Oy,Oz) represents the chromaticity coordinates of the WOLED corresponding to the W data, A(Ax,Ay,Az) and C(Cx,Cy,Cz) represent the chromaticity coordinates of two subpixels participating in the chromatic aberration compensation, respectively, (Wx,Wy,Wz) represents the chromaticity coordinates of the target value, L_WOLED represents the brightness value of the WOLED, and LA and LC represent the gain values of the two subpixels participating in the chromatic aberration compensation, respectively.

Alternatively, the algorithm conversion module is configured to, with respect to the subpixel participating in the chromatic aberration compensation, acquire a product of the gain value of the subpixel and the W data, and calculate a difference between an initial brightness value of the subpixel participating in the chromatic aberration compensation and the product, so as to obtain a final brightness value of the subpixel participating in the chromatic aberration compensation; with respect to the subpixel not participating in the chromatic aberration compensation, calculate a difference between an initial brightness value of the subpixel not participating in the chromatic aberration compensation and the W data so as to obtain a final brightness value of the subpixel not participating in the chromatic aberration compensation, wherein the initial brightness value of the subpixel is obtained in accordance with the R, G and B source data; and determine the output values of the R, G, B and W data in accordance with the final brightness value of the subpixel participating in the chromatic aberration subpixel, the final brightness value of the subpixel not participating in the chromatic aberration subpixel and the brightness value of the WOLED.

The final brightness value of the subpixel may be calculated by the algorithm conversion module using the following equations:

$$R' = R - R\_gain \times W$$

$$G' = G - G\_gain \times W$$

$$B' = B - B\_gain \times W$$

$$W' = L\_WOLED$$

wherein R', G', B' and W' represent the final brightness values of the R, G, B and W subpixels, respectively, R, G and B represent the initial brightness values obtained in accordance with the R, G and B source data, respectively, R_gain, G_gain and B_gain represent the gain values of the R, G and B subpixels, respectively, the gain value of the subpixel not participating in the chromatic aberration compensation is 1, W represents the white data, and L_WOLED represents the brightness value of the WOLED.

In the above embodiments, when the subsequent output values of the R, G, B and W are required to be grayscale values, it is required to convert the obtained brightness output values of the R, G, B and W data into the grayscale values.

In the above embodiments, because the subpixels participating in the chromatic aberration compensation are lighted up frequently due to the chromatic aberration compensation, a service life of each subpixel may probably be shortened. In order to overcome this defect, the use frequency of the subpixels participating in the chromatic aberration compensation may be reduced by adjusting the WMR.

To be specific, the display control device may further include: a judging module configured to judge whether or not a subpixel corresponding to the minimum value of the R, G and B source data is the subpixel participating in the chromatic aberration compensation; a first adjustment module configured to, when the subpixel corresponding to the minimum value of the R, G and B source data is the subpixel participating in the chromatic aberration compensation, increment a value of the currently-stored white-mixing ratio; and a second adjustment module configured to, when the subpixel corresponding to the minimum value of the R, G and B source data is not the subpixel participating in the chromatic aberration compensation, decrement the value of the currently-stored white-mixing ratio.

In addition, the gain values of the subpixels participating in the chromatic aberration compensation may also be counted. When the subpixel corresponding to the minimum value of the R, G and B source data is the subpixel participating in the chromatic aberration compensation, an increment of the currently-stored WMR may be determined in accordance with the counted gain values.

To be specific, the display control device may further include a first counting module configured to count the gain values of the subpixels participating in the chromatic aberration compensation. The first adjustment module is further configured to, when the subpixel corresponding to the minimum value of the R, G and B source data is the subpixel participating in the chromatic aberration compensation, determine an increment of the currently-stored white-mixing ratio in accordance with the counted gain values of the subpixels participating in the chromatic aberration compensation.

In the above embodiments, when it is desired to reach a balance among the use frequencies of the R, G, B and W data, it is required count the output values of the R, G, B and W data, and then adjust the WMR in accordance with the counted output values. To be specific, an average value of the output values of the R, G and B data may be compared with an average value of the output values of the W data. When the average value of the output values of the R, G and B data is greater than that of the W data, the WMR may be incremented, and when the average value of the output values of the R, G and B data is less than that of the W data, the WMR may be decremented.

To be specific, the display control device may further include: a second counting module configured to count the output values of the R, G, B and W data; and a third adjustment module configured to adjust the value of the currently-stored white-mixing ratio in accordance with the counted output values of the R, G, B and W data.

The third adjustment module is configured to compare an average value of the output values of the R, G and B data and an average value of the output value of the W data; when the average value of the output data of the R, G and B data is greater than the average value of the output value of the W data, increment the white-mixing ratio; and when the average value of the output data of the R, G and B data is less than the average value of the output value of the W data, decrement the white-mixing ratio.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A display control method for a white organic light-emitting diode (WOLED) display device, comprising:
   receiving red (R), green (G) and blue (B) source data, and determining a minimum value of the R, G and B source data;
   determining white (W) data in accordance with the minimum value of the R, G and B source data;
   determining chromaticity coordinates of a WOLED in accordance with the W data;
   acquiring a brightness value of the WOLED desired for compensating for the chromaticity coordinates of the WOLED to a target value, and a gain value of a subpixel participating in chromatic aberration compensation; and
   determining output values of R, G, B and W data in accordance with the brightness value of the WOLED, the gain value of the subpixel participating in the chromatic aberration compensation, and the W data,
   wherein:
      the step of determining the chromaticity coordinates of the WOLED in accordance with the W data includes looking up a chromaticity coordinate table in accordance with the W data, so as to acquire the chromaticity coordinates of the WOLED corresponding to the W data,
      different W data, the chromaticity coordinates of the WOLED corresponding to the different W data, and chromaticity coordinates of R, G, and B subpixels are recorded in the chromaticity coordinate table, and
      the step of acquiring the brightness value of the WOLED includes:
         acquiring from the chromaticity coordinate table the chromaticity coordinates of the WOLED corresponding to the W data and the chromaticity coordinates of the subpixel participating in the chromatic aberration compensation, and
         calculating the brightness value of the WOLED desired for compensating for the chromaticity coordinates of the WOLED to the target value, and the gain value of the subpixel participating in chromatic aberration compensation using predetermined color-mixing equations in accordance with the chromaticity coordinates of the WOLED corresponding to the W data and the chromaticity coordinates of the subpixel participating in the chromatic aberration compensation.

2. The display control method according to claim 1, wherein the step of determining the output values of the R, G, B and W data in accordance with the brightness value of the WOLED, the gain value of the subpixel participating in the chromatic aberration compensation and the W data comprises:
   with respect to the subpixel participating in the chromatic aberration compensation, acquiring a product of the gain value of the subpixel and the W data, and calculating a difference between an initial brightness value of the subpixel participating in the chromatic aberration compensation and the product, so as to obtain a final brightness value of the subpixel participating in the chromatic aberration compensation;
   with respect to the subpixel not participating in the chromatic aberration compensation, calculating a difference between an initial brightness value of the subpixel not participating in the chromatic aberration compensation and the W data so as to obtain a final brightness value of the subpixel not participating in the chromatic aberration compensation, wherein the initial brightness value of the subpixel is obtained in accordance with the R, G and B source data; and
   determining the output values of the R, G, B and W data in accordance with the final brightness value of the subpixel participating in the chromatic aberration subpixel, the final brightness value of the subpixel not participating in the chromatic aberration subpixel and the brightness value of the WOLED.

3. The display control method according to claim 2, wherein the final brightness value of the subpixel is calculated using the following equations:

$R' = R - R\_gain \times W;$ $G' = G - G\_gain \times W;$ $B' = B - B\_gain \times W;$ and $W' = L\_WOLED,$ wherein:
R', G', B' and W' represent the final brightness values of the R, G, B and W subpixels, respectively,
R, G and B represent the initial brightness values obtained in accordance with the R, G and B source data, respectively,
R_gain, G_gain and B_gain represent the gain values of the R, G and B subpixels, respectively,
the gain value of the subpixel not participating in the chromatic aberration compensation is 1,
W represents the white data, and
L_WOLED represents the brightness value of the WOLED.

4. The display control method according to claim 1, wherein the step of determining the W data in accordance with the minimum value of the R, G and B source data comprises:
acquiring a currently-stored white-mixing ratio, wherein the white-mixing ratio is a ratio of the W data to the minimum value of the R, G and B source data to be replaced with the W data; and
calculating a product of the minimum value of the R, G and B source data and the white-mixing ratio, so as to obtain the W data.

5. The display control method according to claim 4, wherein prior to the step of determining the W data in accordance with the minimum value of the R, G and B source data, the display control method further comprises:
judging whether or not a subpixel corresponding to the minimum value of the R, G and B source data is the subpixel participating in the chromatic aberration compensation;
when the subpixel corresponding to the minimum value of the R, G and B source data is the subpixel participating in the chromatic aberration compensation, incrementing a value of the currently-stored white-mixing ratio; and
when the subpixel corresponding to the minimum value of the R, G and B source data is not the subpixel participating in the chromatic aberration compensation, decrementing the value of the currently-stored white-mixing ratio.

6. The display control method according to claim 5, wherein the step of incrementing the value of the currently-stored white-mixing ratio comprises:
counting the gain values of the subpixels participating in the chromatic aberration compensation; and
when the subpixel corresponding to the minimum value of the R, G and B source data is the subpixel participating in the chromatic aberration compensation, determining an increment of the currently-stored white-mixing ratio in accordance with the counted gain values of the subpixels participating in the chromatic aberration compensation.

7. The display control method according to claim 4, further comprising:
counting the output values of the R, G, B and W data; and
adjusting the value of the currently-stored white-mixing ratio in accordance with the counted output values of the R, G, B and W data.

8. The display control method according to claim 7, wherein the step of adjusting the value of the currently-stored white-mixing ratio in accordance with the counted output values of the R, G, B and W data comprises:
comparing an average value of the output values of the R, G and B data and an average value of the output value of the W data;
when the average value of the output values of the R, G and B data is greater than the average value of the output value of the W data, incrementing the white-mixing ratio; and
when the average value of the output values of the R, G and B data is less than the average value of the output value of the W data, decrementing the white-mixing ratio.

9. The display control method according to claim 1, wherein the target value is chromaticity coordinates of pure white light desired for the WOLED display device.

10. The display control method according to claim 1, wherein the predetermined color-mixing equations include:

$$L\_WOLED = \left(\frac{Oy}{Wy}\right) * \frac{\left[\frac{Wx - Ax}{Cx - Ax} - \frac{Wz - Az}{Cz - Az}\right]}{\left[\frac{Ox - Ax}{Cx - Ax} - (Oz - Az)\right]},$$

$$LC = \frac{\left(\frac{Cy}{Wy}\right)(Ww - Ax)}{Cx - Ax} - \frac{\left(\frac{L\_WOLED}{Oy}\right)(Ox - Ax)}{Cx - Ax}, \text{ and}$$

$$LA = 1 - L\_WOLED - LC,$$

wherein O(Ox,Oy,Oz) represents the chromaticity coordinates of the WOLED corresponding to the W data, A(Ax,Ay,Az) and C(Cx,Cy,Cz) represent the chromaticity coordinates of two subpixels participating in the chromatic aberration compensation, respectively, (Wx, Wy,Wz) represents the chromaticity coordinates of the target value, L_WOLED represents the brightness value of the WOLED, and LA and LC represent the gain values of the two subpixels participating in the chromatic aberration compensation, respectively.

11. A display control device for a white organic light-emitting diode (WOLED) display device, comprising:
a reception module configured to receive red (R), green (G) and blue (B) source data;
a minimum value determination module configured to determine a minimum value of the R, G and B source data;
a white (W) data determination module configured to determine W data in accordance with the minimum value of the R, G and B source data;
a chromaticity coordinate determination module configured to determine chromaticity coordinates of a WOLED in accordance with the W data;
a gain value determination module configured to acquire a brightness value of the WOLED desired for compensating for the chromaticity coordinates of the WOLED to a target value, and a gain value of a subpixel participating in chromatic aberration compensation; and an algorithm conversion module configured to determine output values of R, G, B and W data in accordance with the brightness value of the WOLED, the gain value of the subpixel participating in the chromatic aberration compensation and the W data, wherein:
the chromaticity coordinate determination module is configured to look up a chromaticity coordinate table in accordance with the W data, so as to acquire the chromaticity coordinates of the WOLED corresponding to the W data,
different W data, the chromaticity coordinates of the WOLED corresponding to the different W data, and chromaticity coordinates of R, G and B subpixels are recorded in the chromaticity coordinate table, and
the gain value determination module is configured:
to acquire from the chromaticity coordinate table the chromaticity coordinates of the WOLED corresponding to the W data and the chromaticity coordinates of the subpixel participating in the chromatic aberration compensation, and
calculate the brightness value of the WOLED desired for compensating for the chromaticity coordinates of the WOLED to the target value, and the gain value of the subpixel participating in chromatic aberration compensation using predetermined color-mixing equations in accordance with the chromaticity coordinates of the WOLED corresponding to the W data and the chromaticity coordinates of the subpixel participating in the chromatic aberration compensation.

12. The display control device according to claim 11, wherein the algorithm conversion module is configured to:
with respect to the subpixel participating in the chromatic aberration compensation, acquire a product of the gain value of the subpixel and the W data, and calculate a difference between an initial brightness value of the subpixel participating in the chromatic aberration compensation and the product, so as to obtain a final brightness value of the subpixel participating in the chromatic aberration compensation;
with respect to the subpixel not participating in the chromatic aberration compensation, calculate a difference between an initial brightness value of the subpixel not participating in the chromatic aberration compensation and the W data so as to obtain a final brightness value of the subpixel not participating in the chromatic aberration compensation, wherein the initial brightness value of the subpixel is obtained in accordance with the R, G and B source data; and
determine the output values of the R, G, B and W data in accordance with the final brightness value of the subpixel participating in the chromatic aberration subpixel, the final brightness value of the subpixel not participating in the chromatic aberration subpixel and the brightness value of the WOLED.

13. The display control device according to claim 12, wherein the final brightness value of the subpixel is calculated by the algorithm conversion module using the following equations:

$R' = R - R\_gain \times W;$ $G' = G - G\_gain \times W;$ $B' = B - B\_gain \times W;$ and $W' = L\_WOLED,$ wherein:
R', G', B' and W' represent the final brightness values of the R, G, B and W subpixels, respectively,
R, G and B represent the initial brightness values obtained in accordance with the R, G and B source data, respectively,
R_gain, G_gain and B_gain represent the gain values of the R, G and B subpixels, respectively,
the gain value of the subpixel not participating in the chromatic aberration compensation is 1,
W represents the white data, and
L_WOLED represents the brightness value of the WOLED.

14. The display control device according to claim 11, further comprising:
a storage module configured to store a white-mixing ratio, wherein the white-mixing ratio is a ratio of the W data to the minimum value of the R, G and B source data to be replaced with the W data,
wherein the W data determination module is configured to acquire a currently-stored white-mixing ratio, and calculate a product of the minimum value of the R, G and B source data and the white-mixing ratio, so as to obtain the W data.

15. The display control device according to claim 14, further comprising:
a judging module configured to judge whether or not a subpixel corresponding to the minimum value of the R, G and B source data is the subpixel participating in the chromatic aberration compensation;
a first adjustment module configured to, when the subpixel corresponding to the minimum value of the R, G and B source data is the subpixel participating in the chromatic aberration compensation, increment a value of the currently-stored white-mixing ratio; and
a second adjustment module configured to, when the subpixel corresponding to the minimum value of the R, G and B source data is not the subpixel participating in the chromatic aberration compensation, decrement the value of the currently-stored white-mixing ratio.

16. The display control device according to claim 15, further comprising:
a first counting module configured to count the gain values of the subpixels participating in the chromatic aberration compensation,
wherein the first adjustment module is further configured to, when the subpixel corresponding to the minimum value of the R, G and B source data is the subpixel participating in the chromatic aberration compensation, determine an increment of the currently-stored white-mixing ratio in accordance with the counted gain values of the subpixels participating in the chromatic aberration compensation.

17. The display control device according to claim 14, further comprising:
a second counting module configured to count the output values of the R, G, B and W data; and
a third adjustment module configured to adjust the value of the currently-stored white-mixing ratio in accordance with the counted output values of the R, G, B and W data.

18. The display control device according to claim 17, wherein:
the third adjustment module is configured to compare an average value of the output values of the R, G and B data and an average value of the output value of the W data;

when the average value of the output values of the R, G and B source data is greater than the average value of the output value of the W data, increment the white-mixing ratio; and when the average value of the output values of the R, G and B source data is less than the average value of the output value of the W data, decrement the white-mixing ratio.

19. The display control device according to claim 11, wherein the target value is chromaticity coordinates of pure white light desired for the WOLED display device.

20. A white organic light-emitting diode (WOLED) display device comprising the display control device according to claim 11.

21. The display control device according to claim 11, wherein the predetermined color-mixing equations include:

$$L\_WOLED = \left(\frac{Oy}{Wy}\right) * \frac{\left[\frac{Wx-Ax}{Cx-Ax} - \frac{Wz-Az}{Cz-Az}\right]}{\left[\frac{Ox-Ax}{Cx-Ax} - (Oz-Az)\right]},$$

$$LC = \frac{\left(\frac{Cy}{Wy}\right)(Ww-Ax)}{Cx-Ax} - \frac{\left(\frac{L\_WOLED}{Oy}\right)(Ox-Ax)}{Cx-Ax}, \text{ and}$$

$$LA = 1 - L\_WOLED - LC,$$

wherein $O(Ox,Oy,Oz)$ represents the chromaticity coordinates of the WOLED corresponding to the W data, $A(Ax,Ay,Az)$ and $C(Cx,Cy,Cz)$ represent the chromaticity coordinates of two subpixels participating in the chromatic aberration compensation, respectively, $(Wx,Wy,Wz)$ represents the chromaticity coordinates of the target value, L_WOLED represents the brightness value of the WOLED, and LA and LC represent the gain values of the two subpixels participating in the chromatic aberration compensation, respectively.

* * * * *